United States Patent [19]

Ford et al.

[11] 4,430,179
[45] Feb. 7, 1984

[54] PORTABLE METHOD FOR FILTER PRESS CELL ASSEMBLY

[75] Inventors: James M. Ford; David B. Wright, both of Cleveland, Tenn.

[73] Assignee: Olin Corporation, New Haven, Conn.

[21] Appl. No.: 289,449

[22] Filed: Aug. 3, 1981

[51] Int. Cl.³ .......................... C25B 1/26; C25B 9/00; C25B 15/08
[52] U.S. Cl. .................................. 204/128; 204/255; 204/257; 204/279
[58] Field of Search .............................. 204/253–258, 204/267–270, 295–296, 279, 128

[56] References Cited

U.S. PATENT DOCUMENTS

| | | | |
|---|---|---|---|
| 4,000,057 | 12/1976 | Mrazek et al. | 204/296 |
| 4,032,423 | 6/1977 | Cunningham | 204/254 |
| 4,056,458 | 11/1977 | Pohto et al. | 204/263 |
| 4,153,532 | 7/1979 | Fitch et al. | 204/267 |
| 4,224,121 | 9/1980 | Dempsey et al. | 204/98 |
| 4,252,628 | 2/1981 | Boulton et al. | 204/257 |
| 4,253,932 | 3/1981 | Mose et al. | 204/279 X |
| 4,268,372 | 7/1981 | Iizima et al. | 204/252 |
| 4,273,641 | 6/1981 | Pere | 204/279 X |
| 4,309,264 | 1/1982 | Bender et al. | 204/258 X |
| 4,311,577 | 1/1982 | Kircher | 204/257 X |

FOREIGN PATENT DOCUMENTS

| | | | |
|---|---|---|---|
| 578896 | 7/1959 | Canada | 204/253 |
| 2054652 | 2/1981 | United Kingdom | 204/257 |

Primary Examiner—Donald R. Valentine
Attorney, Agent, or Firm—Ralph D'Alessandro; Donald F. Clements; Thomas P. O'Day

[57] ABSTRACT

A method for assembling a filter press type of electrolytic cell is disclosed wherein tightening apparatus is employed at preferably multiple points about the periphery of the stacked electrodes to substantially simultaneously apply a substantially uniform pressure to compress the cell to permit the compressed stack of electrodes to be retained in this compressed state while the cell is assembled in a fluid-tight manner.

20 Claims, 3 Drawing Figures

PORTABLE METHOD FOR FILTER PRESS CELL ASSEMBLY

BACKGROUND OF THE INVENTION

This invention relates generally to a method of assembling filter press-type cells and more particularly to a method of assembling a cell in which a substantially simultaneous and uniform pressure is applied to the electrodes that are in a stack, each adjacent pair being sandwiched about separators or membranes and having gaskets inserted therebetween to effect a fluid-tight seal.

Electrolytic cells have been developed which are based on the design principles used in the unit operation of "filter presses" utilized to filter solids from liquids. These "filter press" cells have followed the practice originated with filter presses of assembling plates or frames, which house electrodes with intermediate separators or membranes into a "bank" of frames that are supported in a vertical plane by a filter press skeleton structure. In general, this is a convenient method of assembling since the frames may be stored in place and may be shifted back and forth as the cell is assembled or dismantled. In the filtration field, presses are commercially available that shift frames automatically according to a program. Such presses are generally used with filter press electrolytic cells in order to simplify repairs by providing easier access to individual membranes and electrodes in the cell bank.

It has also been found that treating or conditioning the membranes is essential if the electrolytic cell is to operate at optimum efficiency after assembly. Generally, the membranes are received in a less conductive state and must be converted to conductive form. Additionally, failure to treat or condition the membrane prior to cell assembly will cause excessive swelling or shrinkage of the membrane after the membranes are emplaced within the cell and operation of the cell begun. Excessive swelling causes wrinkling in the membrane after cell assembly. This wrinkling creates a crease that generally bears against the anode and is attacked to chlorine. Apparently the crease from the wrinkle becomes hardened and splits along its top. Alternatively, where excessive shrinkage occurs, cracking or rupturing in the membrane will occur. Either of these two situations where there is a physical break in the surface of the membrane, causes the cell to dramatically drop in operating efficiency because the caustic solution within the cathode compartment is permitted to flow into the anolyte. This will decrease the quantity of chlorine gas produced within a fixed time period. Additionally, chlorate levels increase in the anolyte and catholyte fluids.

Once the electrode frames are in place with the separators or membranes sandwiched between each adjacent pair of electrodes, a further problem presents inself. This is the problem of finding an economical and safe way in which to compress the stack of electrodes and the gaskets separating the electrodes from the membranes or separators into an assembled state. Traditionally, this portion of the assembly step is accomplished manually by the tightening of nuts on the plurality of tie bolts which are positioned about the periphery of the cells. This manual compressing of the electrodes together is a time consuming and difficult job since it must be done individually for each tie bolt about the periphery of the frame. There can be as many as ten or more tie bolts utilized to hold a compressed and assembled cell together. The gaskets separating the separators or membranes from the appropriate electrode frame must have a predetermined amount of compression applied to them to obtain the proper amount of gasket pressure to form a fluid-tight seal. This gasket pressure is dependent upon the size, shape, and durometer of the gasket employed and can require up to about 70 tons of force to be applied to the cell.

Obviously, manually compressing or tightening the stack is going to be difficult and likely will result in variable compression forces at each of the tie bolts because of the inability to uniformly apply the compression forces manually, such as with wrenches. The fatigue factor also affects the speed and safety with which this tightening can be accomplished. As the individuals assembling the cell become more tired, the chances for accident or injury increase. Since it is difficult to obtain uniform application of pressure at each of the points where the tie bolts are located about the periphery of the stack by manually torquing down the nut on the tie bolt, it is frequently possible to over-tighten or over-compress and cause damage to the gaskets. Alternatively, it is possible to have less than the required amount of compression applied to the frames and the gaskets in the stack. In either case, during operation of the fully assembled cell the result will be leakage of potentially harmful process liquids from the cell. In those filter press type of cells where membranes were employed, there is the additional danger of damaging the membranes from over-compression during assembly.

An alternative method of assembling filter press type cells has employed the use of a large hydraulic ram to compress the cell components together. This technique suffers from several disadvantages. Since a single ram plate or engaging surface is utilized, it is possible to have a "high" point on the cell frame that bears a greater portion of the compressive force than the remaining points about the frame, thereby resulting in unequal or nonuniform compression about the periphery of the cell. Additionally, this type of system requires that the hydraulic ram remain in place while the cell is electrolytically operated.

Another disadvantage of the previous methods employed to assemble electrolytic cells, especially those of the filter press type, is the size of the apparatus needed to effect compression and assembly of the cell. The apparatus typically employed is not light enough to be portable, so that the cell normally cannot be assembled at its intended operation site. Instead the cells normally are assembled at at least one location and then transported to their operating site. This is time consuming and risks damaging the cells during transport.

A solution to these and other problems is achieved with the instant invention by providing a method utilizing portable apparatus for substantially simultaneously and uniformly applying compressive forces about the periphery of a generally vertical stack of generally horizontally oriented electrode frames that have a horizontal membrane sheet inserted between each pair of opposing frames to effect a fluid-tight assembled cell.

BRIEF DESCRIPTION OF THE DRAWINGS

The advantages of this invention will become apparent upon consideration of the following detailed disclosure of the invention, especially when it is taken in conjunction with the drawings wherein.

SUMMARY OF THE INVENTION

Figure 1:
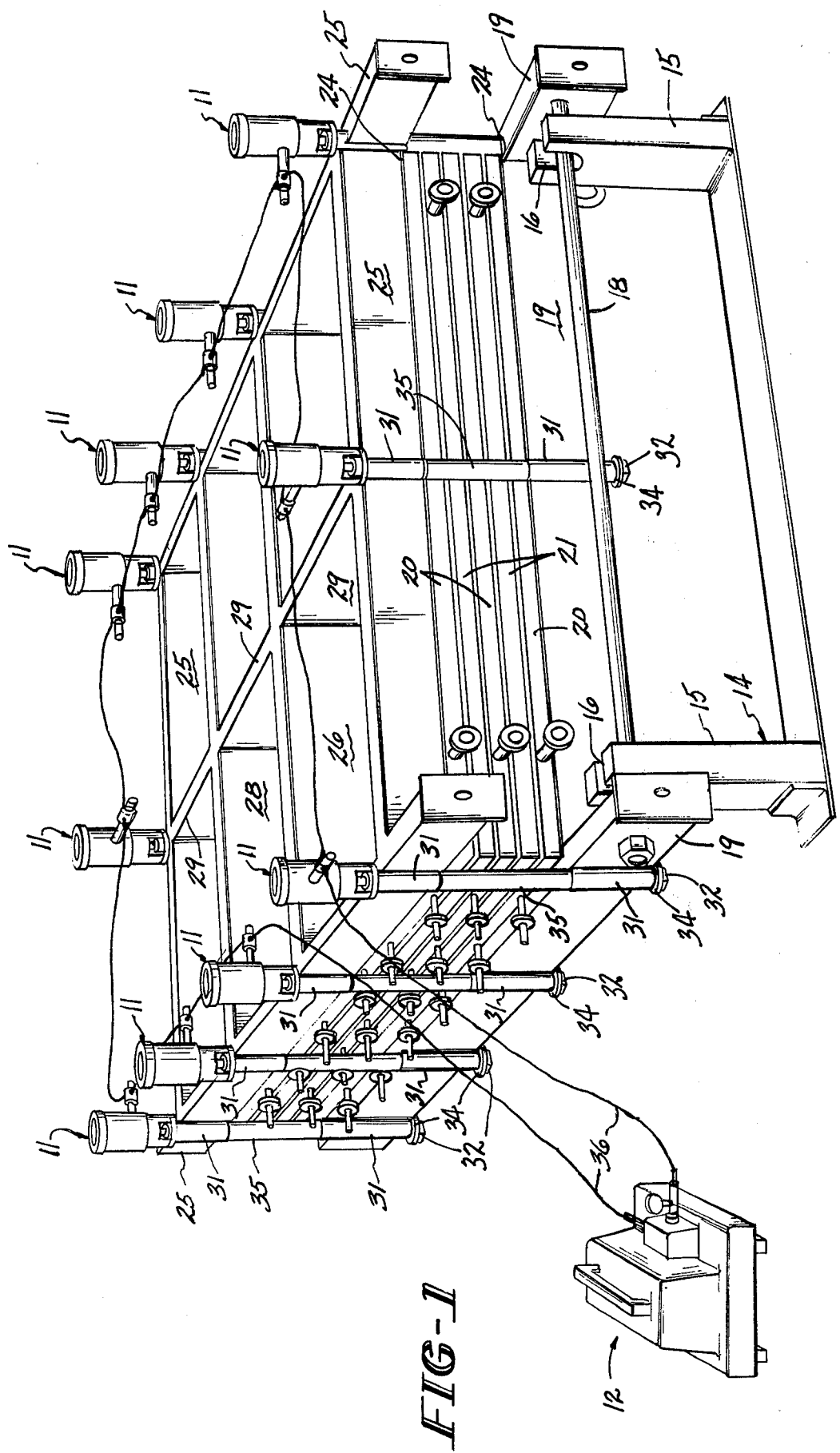
FIG. 1 is a side perspective view of a filter press membrane cell mounted on an assembly support frame with tie bolts passing through the top and bottom cell end frame members and having hydraulic tools or cell tightening means shown mounted on each tie bolt, each hydraulic tool being connected in hydraulic circuit to the hydraulic pump/reservoir.

It is an object of the present invention to provide a method of filter press cell assembly that utilizes portable apparatus to substantially simultaneously apply uniform pressure about the periphery of the cell to compress the cell into a fluid-tight assembly to permit tie bolt nuts to be tightened to thereby retain the cell in an assembled fluid-tight configuration.

It is another object of the present invention to provide a method that permits cell assembly to be conducted rapidly and relatively safely.

It is another object of the present invention to provide a method for assembling filter press type electrolytic cells that employs portable apparatus which may be utilized at a plurality of locations about a production plant and not be restricted to a single or fixed site.

It is a feature of the present invention that the method employs a predetermined number of long stroke hydraulic cylinders or tighteners at predetermined locations about the cell's periphery to compress the individual electrodes, the separators or membranes about which each adjacent pair of electrodes are sandwiched, and the gaskets which are interspersed between electrodes and the membranes into a fluid-tight configuration.

It is another feature of the present invention that the method of assembly utilizes a portable pump and reservoir system.

It is an advantage of the present invention that the job of assembling a filter press type cell is greatly simplified and the time for assembly is dramatically shortened.

It is another disadvantage of the present invention that the instant method of assembly of a filter press type of cell is made safer than when cell compression is accomplished manually.

It is another advantage of the present invention that the substantially simultaneous and uniform application of a predetermined compression force to the electrodes in the stack forming the cell improves the ability to control the tightening or compression step during cell assembly and therefore reduces the risk of over-tightening, and the subsequent ruining of the gaskets, or under-tightening of the stack of electrodes.

It is a further advantage of the present invention that the risk of leakage of process chemicals during operation because of either over-tightening or under-tightening of the stack of electrodes is substantially reduced.

It is yet a further advantage of the present method of assembly that a consistently uniform pressure is achieved about the cell's periphery between the adjacent electrode frames and the gaskets.

It is still a further advantage of the present invention that fewer personnel are required to accomplish cell assembly of a filter press type of cell.

It is yet another advantage of the present method of assembly that potential damage to the membranes or separators from over-compression is avoided because of the predetermined amount of pressure that is uniformly applied at each point where a tie rod is positioned about the periphery of the stack of electrodes comprising the cell.

These and other objects, features, and advantages are obtained by utilizing a method of assembly to compress filter press type of electrolytic cells that employs a predetermined number of compression means to substantially simultaneously apply a substantially uniform pressure about the periphery of the cell to compress the cell a generally uniform predetermined amount to permit the cell to be quickly assembled and retained in a compressed and fluid-tight state.

DETAILED DESCRIPTION

FIG. 1 shows cell 10 in position to be compressed by the plurality of tightening means 11 and the tightening control means 12. As shown in FIG. 1, cell 10 is mounted on a supporting frame or jig, indicated generally by the numeral 14, that consists of four vertical posts 15 (only two of which are shown) that have U-shaped notches or slots 16 in the top-most portion to receive an elongate support rod 18 that is appropriately fastened to the bottom cell end frame 19. Atop the bottom cell end frame member 19 are a plurality of alternately positioned cathode frames 20 and anode frames 21. Each cathode frame 20 and anode frame 21 have a pair of generally parallel and opposing electrode surfaces (not shown) appropriately attached thereto.

Figure 2:
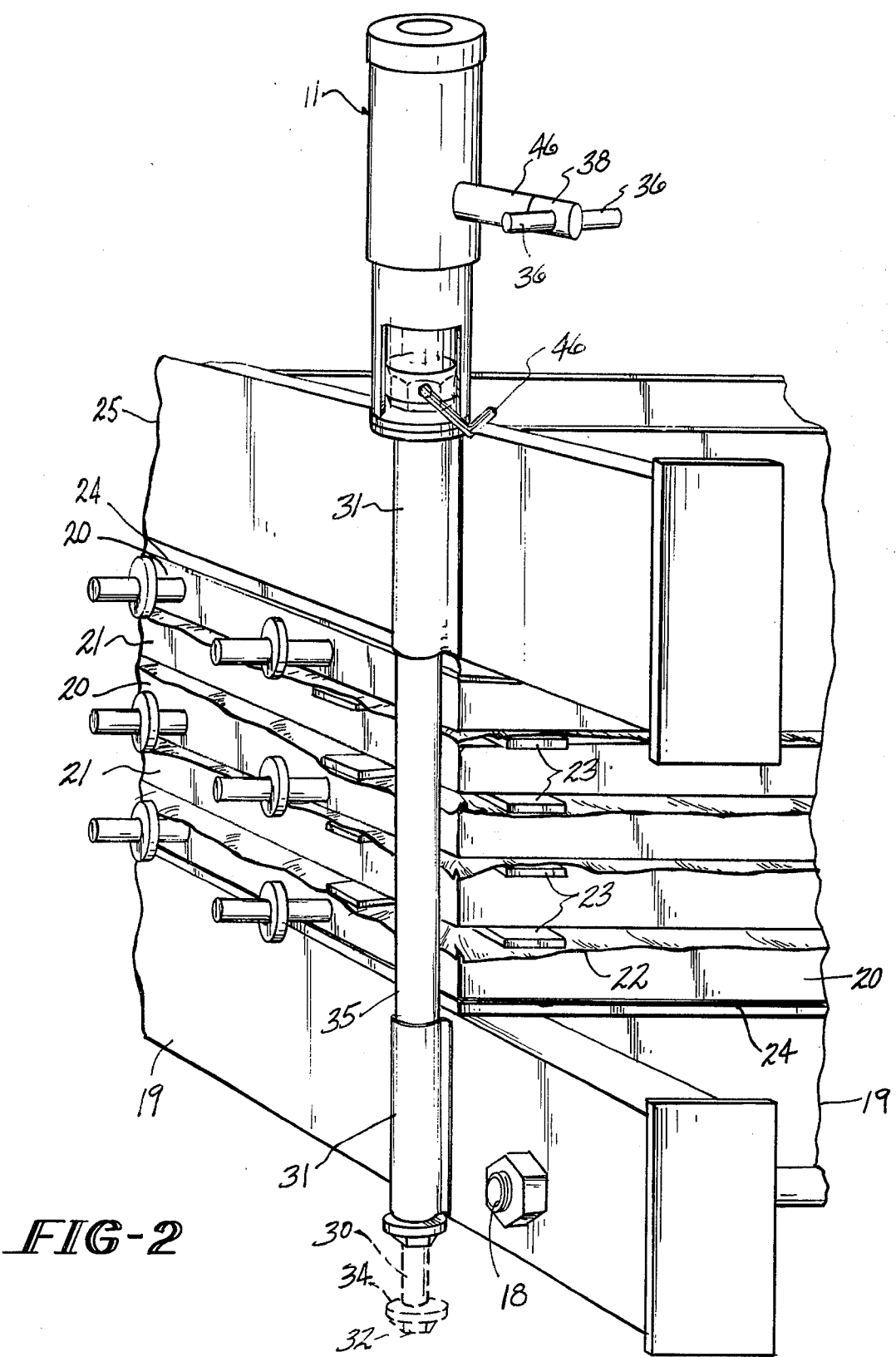
FIG. 2 is a side perspective view of a portion of the filter press electrolytic cell showing one hydraulic tool or cell tightener fastened on a single tie bolt, the tie bolt being shown in phantom in its position prior to tightening.

A separator or membrane 22 is sandwiched between each adjacent cathode frame 20 and anode frame 21, as best seen in FIG. 2. Gaskets (not shown) are placed about the periphery of cathode frames 20 and anode frames 21 such that each adjacent cathode frame 20 and anode frame 21 are separated from each other by a gasket, a separator or membrane 22, and a second gasket. Sheets of micarta insulators 24, or other suitable insulators are placed between the two end cathode frames 20 and bottom cell end frame 19 and top cell end frame 25. Spacer blocks 23, made of an appropriate insulative material, such as micarta, may also be employed to ensure uniform interelectrode spacing.

Both the bottom cell end frame 19 and the top cell end frame 25 have intermediate horizontal reinforcing members and intermediate vertical reinforcing members. As best seen in FIG. 1, top cell end frame 25 has intermediate horizontal support members 26 and 28 connecting the two sides of the frame and vertical support members 29 running from the top to the bottom of the top cell end frame 25. The bottom cell end frame 19 and the top cell end frame 25 are secured together by a plurality of tie bolts 30 positioned about the periphery of the cell 10. Tie bolts 30 are inserted through sleeves 31 on the bottom, sides and tops of both bottom cell end frame 19 and top cell end frame 25. Sleeves 31 are appropriately fastened, such as by welding to the appropriate end frame. Tie bolts 30 have a head portion 32 on one end and a threaded portion (not shown) on the opposing end. Appropriately sized nuts (not shown) are screwed onto the threaded portion of each tie bolt 30 after the cell 10 is compressed to retain the cell in its compressed state. A washer 34 is generally placed against the head portion 32 and the tie bolts are inserted into the sleeves 31 of the bottom cell end frame 19. An insulator 35 is placed over each of the tie bolts 30 to prevent the conduction of electrical current through the cathode frames 20 and anode frames 21 into the tie bolts 30 during cell operation. The tie bolts 30 are then inserted into the sleeves 31 of the top cell end frame and are in position for tightening during the compression portion of the cell assembly.

The cell 10 and the method of assembling the cell 10 in its configuration as shown in FIG. 1 has been described only generally thusfar. A more detailed description of both the cell and the assembly steps are found in U.S. patent application Ser. No. 230,230 now U.S. Pat. No. 4,367,134 to Kircher, filed Feb. 2, 1981, hereinafter specifically incorporated by reference in pertinent part insofar as that disclosure is consistent with the instant application.

Tightening control means 12 includes a portable base unit that serves as a reservoir for hydraulic fluid, a pump and a pressure gauge to indicate the amount of pressure being forced through the hydraulic circuit to each of the tightening means 11. The pump can be electric or pneumatic, or any other suitable type. Tightening control means 12 is commercially available from Enerpac, Inc.

As best seen in FIG. 1 the tightening control means 12 is connected to each of the tightening means 11 via the hydraulic harness 36. Hydraulic fluid is forced by the pump within control means 12 out a flow valve (not shown) into the hydraulic harness 36. The hydraulic harness 36 is then connected with the hydraulic connection 38 of the first tightening means 11, see briefly FIG. 2. The hydraulic connection 38 permits hydraulic fluids to flow into the individual tightening means 11 where it is utilized to cause the tightening means to compress the cell 10. Hydraulic connection 38 is constructed so that hydraulic fluid can continue to flow about the hydraulic circuit in the harness while some fluid enters each tightening means 11. After having traveled about the entire hydraulic circuit of FIG. 1, the hydraulic fluid returns to the reservoir within the tightening control means 12 via a pump return valve (not shown). Alternatively, the hydraulic circuit has been utilized with a bidirectional flow line in the hydraulic harness 36 and a bleeder valve (not shown) at the last hydraulic connection 38 in the circuit. The pump return valve is then replaced by a threeway valve which controls the direction of flow of hydraulic fluid about the circuit.

Figure 3:
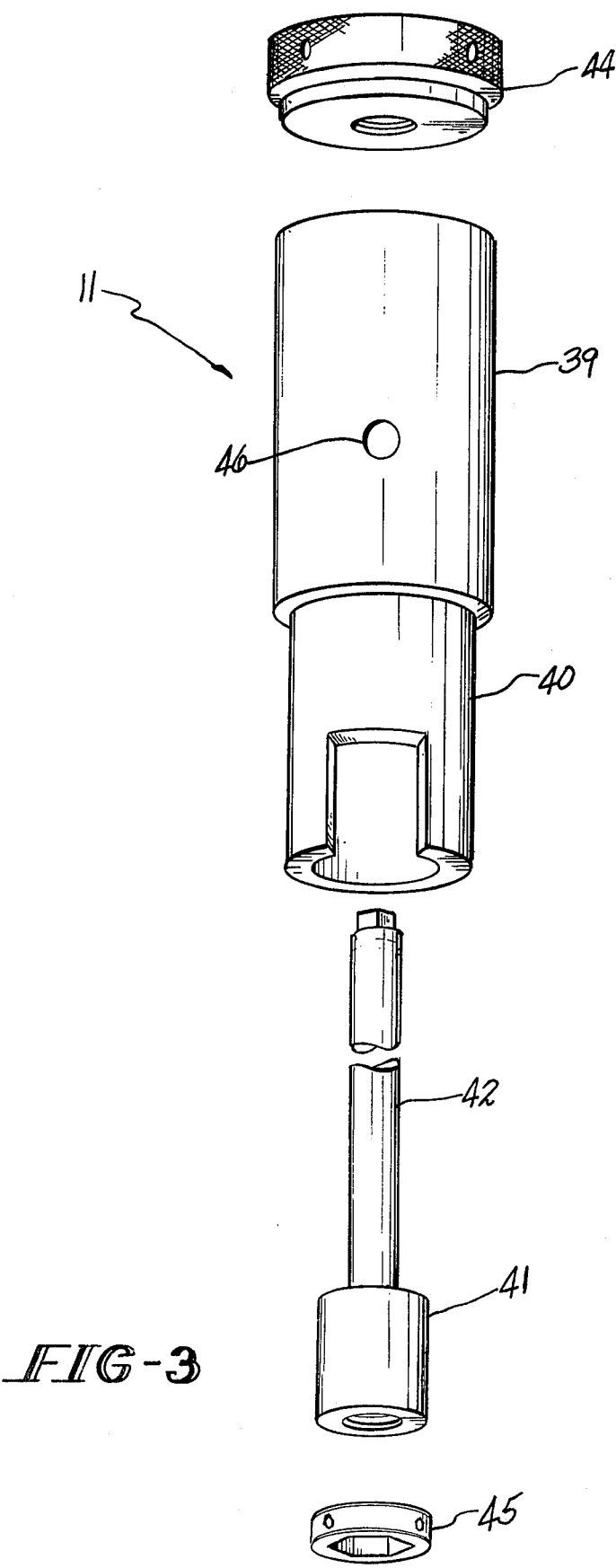
FIG. 3 is an exploded view of the hydraulic tool or cell tightener.

The individual tightening means 11 is comprised of three main components, best seen in FIG. 3. A hydraulic jacking ring 39 is connected to the bridge 40. Threaded lifting nut 44 screws onto the top of puller bar 42 after puller bar 42 has been inserted through bridge 40 and jacking ring 39. A threaded lifting collar 41 is connected to puller bar 42. A threaded lifting nut 44 sits atop the hydraulic jacking ring 39 and screws into the top of the puller bar 42. A nut rotating disc 45 is shaped to fit over the hexagonal nuts (not shown) that are screwed onto the end of tie bolts 30 (briefly refer to FIG. 2) to secure the cell 10 in its compressed state. When assembled, nut rotating discs 45 are placed over the aforementioned hexagonal nuts on the tie bolts 30 and the tightening means 11 is placed over the tie bolts at which points the compression is to be applied about the periphery of the cell 10. The hexagonal nut (not shown) is screwed onto the top of the individual tie bolts 30 and the nut rotating disc 45 is placed about the hexagonal nut. The threaded lifting collar 41 is then screwed into the top portion of the threaded portion of the tie bolts, thus securing the tightening means 11. The threaded lifting nut 44 is also screwed on tightly to the threaded portion (not shown) at the top of the puller bar 42 until the bottom portion of the threaded lifting nut 44 is flush with the piston (not shown) of the hydraulic jacking ring 39.

The hydraulic jacking ring 39 has a probe 46 inserted through its side to provide the external hydraulic connection for the hydraulic oil supply between the hydraulic connection 38, the hydraulic harness 36, and the tightening means 11. The probe 46 links the hydraulic connection 38 to the hydraulic oil grooves (not shown) within the tightening means 11. When in use, oil is pumped through the hydraulic connection and via the probe into the hydraulic oil grooves. The close tolerance of the piston (not shown) and the jacking ring body prevents excessive amounts of oil from escaping between the jacking ring piston and the body. As the pressure is increased, the oil is forced down through oil grooves (not shown) and pushes the piston out of the body. Piston movement is transmitted through the threaded lifting nut 44 via the puller bar 42 and the threaded lifting collar 41 to the tie bolt 30. Tightening means 11 is obtainable from Sealol, Inc. of Providence, R.I. and provides a relatively long stroke, low load instrument.

After the tightening means 11 has been pressurized by hydraulic fluids being forced throughout the system by the hydraulic pump, a turning bar or Allen wrench 46, best seen in FIG. 2, may be inserted within suitably sized openings in the nut rotating discs 45 to turn the nut rotating disc 45 and hexagonal nut (not shown) about which it seats to a tightened position. This permits the cell 10, after it has been compressed using the compression force of the piston within the tightening means 11, to be retained in its compressed state by tightening the hexagonal nut until it is seated firmly against the sleeve 31. This obviates the need to manually torque the hexagonal nut to compress the cell manually. Once completed, the oil pressure is released slowly within the hydraulic harness 36, permitting the tightening means to be removed from the tie bolts and retaining hexagonal nuts.

If desired, spacing washers may be positioned between the sleeves 31 of the top cell end frame 25 and the hexagonal nut prior to placing the hexagonal nuts on the threaded end of the tie bolts 30. Additionally, an automatic system may be employed to turn the nut rotating disc 45 to tighten the hexagonal nuts in lieu of a manual turning bar or allen wrench 46. A multi-staged hydraulic device may also be employed in the alternative, as opposed to the one step large stroke hydraulic tightening means 11 described herein.

In operation, the bottom cell end frame 19 is placed generally horizontally in the support frame or jig 14. A micarta insulator 24 is placed on top of the bottom cell end frame 19 and a cathode end frame 20 is placed thereupon. A gasket (not shown) is placed about the cathode frame and a membrane or separator 22 is spread thereacross. Another gasket (not shown) is placed about the periphery of the membrane prior to the anode frame 21 being placed thereatop. This procedure is repeated with each additional cathode frame 20 and anode frame 21 until the final cathode end frame 20 is placed atop the separator or membrane 22 and gasket. A micarta insulator 24 is placed about the end cathode frame 20 and the top cell end frame 25 is placed thereatop. Washers 34 are then placed about the tie bolts 30 and tie bolts 30 are inserted through sleeves 31 of the bottom end frame 19. Insulators 35 are placed about the tie bolts 31 and the tie bolts are inserted through the sleeves 31 of the top end frame 25.

The hexagonal nuts are then screwed onto the threaded portion of the tie bolts 30 and the nut rotating discs 45 are placed thereabout. The threaded lifting collar 41 for each tightening means 11 is then screwed onto each tie bolt 30 until it bottoms thereagainst. The bridge 40 and hydraulic jacking means 49 are then placed over the puller bar 42 and nut rotating disc 45. The puller bar 42 is then screwed into the threaded lifting collar 41 until it bottoms and the threaded lifting nut 44 is then screwed into the top of puller bar 42 until it seats firmly against the piston portion of the hydraulic jacking ring 39. The hydraulic harness 36 is connected to each of the hydraulic connections 38 of tightening means 11. The hydraulic harness 36 is also connected to the tightening control means 12 and the pump therewithin is activated to pressurize the system until the desired extension of the piston is achieved exerting the desired and predetermined compression force against the cell 10 at the predetermined points about the periphery where the tie bolts 30 are located. The hexagonal nuts are then tightened by inserting the turning bar or Allen wrench 46 into the nut rotating disc 45 and turning the nut rotating disc 45 until the hexagonal nuts are tight against sleeves 31. The hydraulic pressure is then relieved and the tightening means 11 are removed by reversing the installing steps just described.

While the preferred structure in which the principles of the present invention have been incorporated is shown and described above, it is to be understood that the invention is not to be limited to the particular details thus presented, but in fact, widely different means may be employed in the practice of the broader aspects of this invention. For example, the cell 10 may be assembled by the instant method with the electrodes positioned either horizontally or vertically prior to compression. When positioned vertically the stack is built horizontally to a predetermined length. The scope of the appended claims is intended to encompass all obvious changes in the details, materials and arrangement of parts which will occur to one of skill in the art upon a reading of the disclosure.

Having thus described the invention, what is claimed is:

1. A method of assembling a filter press type of electrolytic cell comprising the steps of:
   (a) assembling a plurality of horizontally positioned electrodes in parallel side-by-side relationship, each adjacent pair of electrodes being sandwiched about a separator thereby forming a vertically rising stack, each electrode further having a periphery, the cumulative electrode peripheries thereby defining a periphery for the stack;
   (b) placing a plurality of tightening means at selected locations about the periphery of the stack;
   (c) connecting the tightening means to a tightening control means;
   (d) activating the tightening control means to substantially simultaneously and substantially uniformly compress the stack via the tightening means at the selected locations;
   (e) securing the compressed stack in its compressed state;
   (f) activating the tightening control means to relieve the compression on the tightening means while the stack is retained in its compressed state;
   (g) disconnecting the tightening control means from the tightening means, and
   (h) removing the tightening means from the selected locations about the periphery of the cell.

2. The method according to claim 1 wherein the horizontally positioned electrodes are of opposite polarity in adjacent positions within the stack to thereby form a monopolar filter press cell.

3. The method according to claim 2 wherein the first and last of the plurality of horizontally positioned electrodes in the stack are end cathodes.

4. The method according to claim 2 wherein the first and last of the plurality of horizontally positioned electrodes in the stack are end anodes.

5. The method according to claim 1 wherein the horizontally positioned electrodes are bipolar in adjacent positions within the stack to thereby form a bipolar filter press cell.

6. The method according to claim 1 further comprising preconditioning the separators in a bath of hydrolyzing fluid prior to their being positioned between the adjacent electrodes.

7. A method of assembling a filter press type of electrolytic cell comprising the steps of:
   (a) positioning a plurality of cathodes and anodes in alternating sequence in a stack at an assembly location, each cathode and anode having a periphery which taken cumulatively defines the periphery of the stack, each cathode and anode further being sandwiched about a separator such that there is one more cathode than anode in the stack;
   (b) placing a plurality of tightening means at selected locations about the periphery of the stack;
   (c) connecting the tightening means to a tightening control means;
   (d) activating the tightening control means to substantially simultaneously and substantially uniformly compress the stack via the tightening means at the selected locations;
   (e) securing the compressed stack in its compressed state via retaining means;
   (f) deactivating the tightening control means to substantially simultaneously relieve the compression exerted via the tightening means while the retaining means continues to secure the stack in its compressed state;
   (g) disconnecting the tightening control means from the tightening means; and
   (h) removing the tightening means from the selected locations about the periphery of the cell.

8. The method according to claim 7 wherein the cathodes and anodes are positioned horizontally and the stack is built vertically to a predetermined height.

9. The method according to claim 7 wherein the cathodes and anodes are positioned vertically and the stack is built horizontally to a predetermined length.

10. The method according to claims 8 or 9 further comprising assembling end cathodes as the first and last cathodes in the plurality of cathodes in the stack.

11. The method according to claim 10 further comprising preconditioning the separators in a bath of hydrolyzing fluid prior to their being positioned between the adjacent cathodes and anodes.

12. A method of assembling a filter press type of electrolytic cell comprising the steps of:

(a) assembling a plurality of horizontally positioned electrodes in parallel side-by-side relationship; each adjacent pair of electrodes being sandwiched about a separator thereby forming a vertically rising stack, each electrode further having a periphery which cumulatively taken defines the periphery of the stack;

(b) placing a plurality of tightening means at selected locations about the periphery of the stack;

(c) connecting the tightening means to a tightening control means;

(d) activating the tightening control means to substantially simultaneously and substantially uniformly compress the stack via the tightening means at the selected locations;

(e) securing the compressed stack in its compressed state;

(f) deactivating the tightening control means to relieve the compression exerted via the tightening means while the stack is secured in its compressed state;

(g) disconnecting the tightening control means from the tightening means;

(h) removing the tightening means from the selected locations about the periphery of the cell;

(i) rotating the compressed vertical stack so that the horizontally positioned electrodes and the separators are positioned vertically in an assembled cell;

(j) connecting the vertically positioned assembled cell into an electrical circuit and to raw material supply lines and product withdrawal lines; and (k) electrolytically operating the vertically positioned assembled cell.

13. The method according to claim 12 wherein the horizontally positioned electrodes are of opposite polarity in adjacent positions within the stack to thereby form a monopolar filter press cell.

14. The method according to claim 13 further comprising assembling end cathodes as the first and last electrodes in the plurality of horizontally positioned electrodes.

15. The method according to claim 13 further comprising end anodes as the first and last electrodes in the plurality of horizontally positioned electrodes.

16. The method according to claim 12 wherein the horizontally positioned electrodes are bipolar in adjacent positions within the stack to thereby form a bipolar filter press cell.

17. The method according to claim 12 further comprising preconditioning the separators in a bath of hydrolyzing fluid prior to their being positioned between adjacent electrodes.

18. A method of assembling a filter press type of electrolytic cell comprising the steps of:

(a) positioning a plurality of cathodes and anodes in alternating sequence in a stack at an assembly location, each cathode and anode being circumscribed by a frame to which are attached the opposing respective cathode and anode electrode surfaces, the frames thereby defining a periphery for the stack, each adjacent cathode and anode further being sandwiched about a separator such that there is one more cathode than anode in the stack;

(b) inserting a plurality of tie bolts into retainer sleeves on the cell at selected locations about the periphery of the stack;

(c) fastening tightening means to at least one of the tie bolts located about the periphery of the stack;

(d) connecting the tightening means to a tightening control means;

(e) activating the tightening means to compress the stack;

(f) securing the compressed stack at the selected tie bolt location;

(g) deactivating the tightening control means while the compressed stack continues to be compressed at the selected tie bolt location;

(h) unfastening the tightening means from the selected tie bolt and refastening it to another tie bolt;

(i) activating the tightening means to compress the stack;

(j) securing the compressed stack at the selected tie bolt location;

(k) deactivating the tightening control means while the compressed stack continues to be compressed at the selected tie bolt location;

(l) unfastening the tightening means from the selected tie bolt and refastening it to another tie bolt; and (m) repeating steps i-l a predetermined number of times until the entire stack is compressed and secured about its entire periphery.

19. The method according to claim 18 further comprising disconnecting the tightening control means from the tightening means.

20. The method according to claim 19 further comprising unfastening the tightening means from the selected tie bolts.

* * * * *

UNITED STATES PATENT AND TRADEMARK OFFICE
CERTIFICATE OF CORRECTION

PATENT NO. : 4,430,179
DATED : February 7, 1984
INVENTOR(S) : Ford et al.

It is certified that error appears in the above-identified patent and that said Letters Patent is hereby corrected as shown below:

Column 1, line 42, "to" should read --by--.
Column 1, line 56, "in-" should read --it---.
Column 3, line 48, "disadvantage" should read --advantage--.

Signed and Sealed this

Seventeenth Day of July 1984

[SEAL]

Attest:

GERALD J. MOSSINGHOFF

Attesting Officer    Commissioner of Patents and Trademarks